(12) United States Patent
Hwang

(10) Patent No.: US 7,124,776 B1
(45) Date of Patent: Oct. 24, 2006

(54) WATER FAUCET HAVING DIFFERENT OUTPUT EFFECTS

(76) Inventor: Ren-Yih Hwang, 667, Sec, 2, Lu Ho Rd., Laio-Tsuo Li, Lu-Kang Chen, Changhua Hsien (TW)

( * ) Notice: Subject to any disclaimer, the term of this patent is extended or adjusted under 35 U.S.C. 154(b) by 271 days.

(21) Appl. No.: 10/914,320

(22) Filed: Aug. 9, 2004

(51) Int. Cl.
*F16K 3/08* (2006.01)
*F16K 11/22* (2006.01)

(52) U.S. Cl. ............ 137/606; 251/174; 251/209; 251/310

(58) Field of Classification Search ........ 137/606, 137/625.32; 251/174, 209, 304, 310
See application file for complete search history.

(56) References Cited

U.S. PATENT DOCUMENTS

| | | | | |
|---|---|---|---|---|
| 783,313 | A * | 2/1905 | Roberts ............... | 137/606 |
| 1,506,691 | A * | 8/1924 | Thomas ............... | 137/606 |
| 3,009,679 | A * | 11/1961 | Williams ............. | 251/172 |
| 3,677,516 | A * | 7/1972 | Hicks ................. | 251/174 |
| 3,974,858 | A * | 8/1976 | Nielsen ............... | 137/606 |
| 3,998,227 | A * | 12/1976 | Holbrook et al. ..... | 251/209 |
| 4,126,296 | A * | 11/1978 | Skor et al. .......... | 251/363 |
| 4,453,567 | A * | 6/1984 | MacDonald .......... | 137/614.11 |
| 4,700,928 | A * | 10/1987 | Marty ................. | 251/310 |
| 4,776,565 | A * | 10/1988 | Sheen ................. | 251/310 |

* cited by examiner

*Primary Examiner*—Stephen M. Hepperle
(74) *Attorney, Agent, or Firm*—Alan D. Kamrath; Nikolai & Mersereau, P.A.

(57) ABSTRACT

A water faucet includes a valve body, two conducting members, a valve seat, two control valves, two control handles, and two control plates. Thus, the water faucet is available for an upright water outlet pipe and a horizontal water outlet pipe, so that the water faucet has different water output ways, thereby enhancing the versatility of the water faucet.

20 Claims, 10 Drawing Sheets

WATER FAUCET HAVING DIFFERENT OUTPUT EFFECTS

BACKGROUND OF THE INVENTION

1. Field of the Invention

The present invention relates to a water faucet, and more particularly to a water faucet having different output effects, thereby enhancing the versatility of the water faucet.

2. Description of the Related Art

A conventional water faucet mixes the cold water from the cold water pipe and the hot water from the hot water pipe, so that the mixed water flowing outward from the mixed water faucet has a proper temperature. However, the conventional water faucet is only available an upright water outlet pipe or a horizontal water outlet pipe, so that the conventional water faucet only has a single water output way, thereby limiting the versatility of the water faucet.

SUMMARY OF THE INVENTION

In accordance with the present invention, there is provided a water faucet, comprising:

a valve body having an inside formed with a valve chamber and an end face formed with two receiving recesses and two water inlet holes;

two conducting members each mounted in a respective one of the two receiving recesses of the valve body and each formed with a conducting hole communicating with a respective one of the two water inlet holes of the valve body;

a valve seat mounted in the valve chamber of the valve body;

two control valves each rotatably mounted on the valve seat and each having a peripheral wall formed with two opposite water outlet ports each communicating with the valve chamber of the valve body;

two control handles each pivotally mounted on the valve body and each having a distal end secured on a respective one of the two control valves to rotate the two control valves; and two control plates each secured on a respective one of the two control valves to rotate therewith and each formed with a control hole that communicates with the water outlet ports of the respective control valve and is movable to align with the conducting hole of a respective one of the two conducting members.

The primary objective of the present invention is to provide a water faucet having different output effects, thereby enhancing the versatility of the water faucet.

Another objective of the present invention is to provide a water faucet that is mounted easily and conveniently, thereby facilitating a user mounting the water faucet.

A further objective of the present invention is to provide a water faucet, wherein the water faucet is both available for an upright water outlet pipe and a horizontal water outlet pipe, so that the water faucet has different water output ways, thereby enhancing the versatility of the water faucet.

Further benefits and advantages of the present invention will become apparent after a careful reading of the detailed description with appropriate reference to the accompanying drawings.

DETAILED DESCRIPTION OF THE INVENTION

Figure 1:
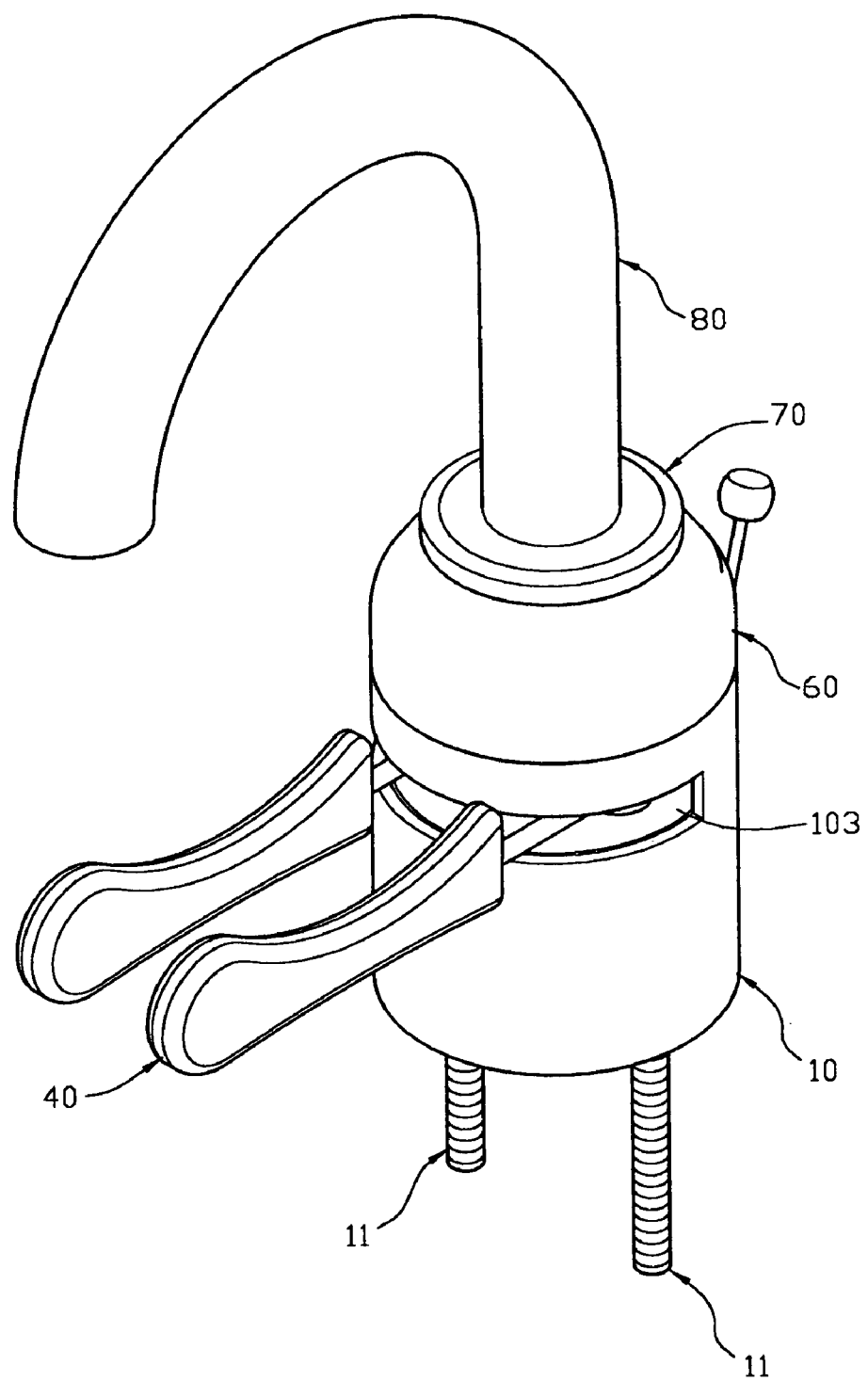
FIG. 1 is a perspective view of a water faucet in accordance with the preferred embodiment of the present invention.
Figure 2:
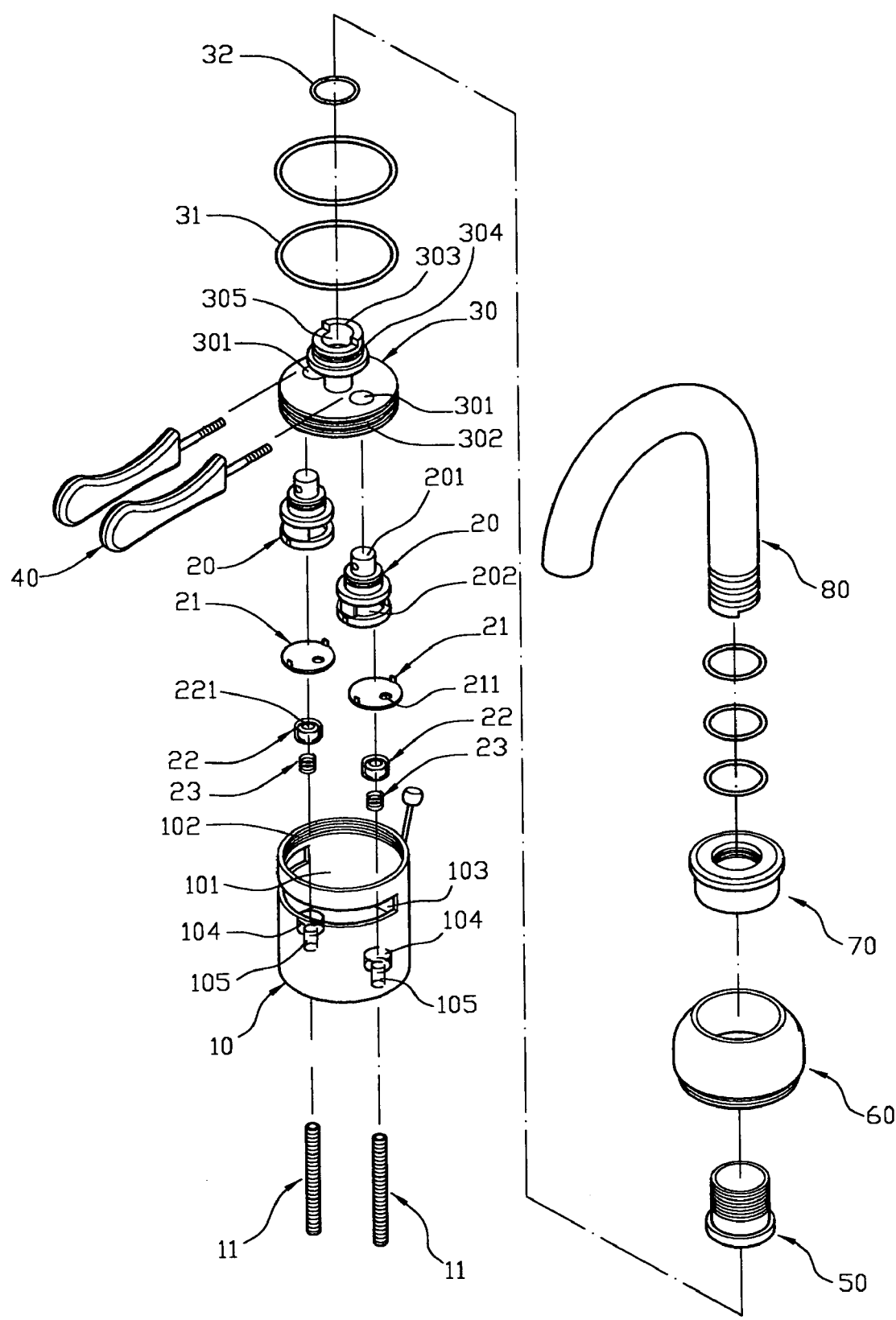
FIG. 2 is an exploded perspective view of the water faucet as shown in FIG. 1.

Referring to the drawings and initially to FIGS. 1–4, a water faucet in accordance with the preferred embodiment of the present invention comprises a valve body 10 having an inside formed with a valve chamber 101 and an end face formed with two receiving recesses 104 and two water inlet holes 105, two conducting members 22 each mounted in a respective one of the two receiving recesses 104 of the valve body 10 and each formed with a conducting hole 221 communicating with a respective one of the two water inlet holes 105 of the valve body 10, a valve seat 30 mounted in the valve chamber 101 of the valve body 10, two control valves 20 each rotatably mounted on the valve seat 30 and each having a peripheral wall formed with two opposite water outlet ports 202 each communicating with the valve chamber 101 of the valve body 10, two control handles 40 each pivotally mounted on the valve body 10 and each having a distal end secured on a respective one of the two control valves 20 to rotate the two control valves 20, and two control plates 21 each secured on a respective one of the two control valves 20 to rotate therewith and each formed with a control hole 211 that communicates with the water outlet ports 202 of the respective control valve 20 and is movable to align with the conducting hole 221 of a respective one of the two conducting members 22.

Figure 3:
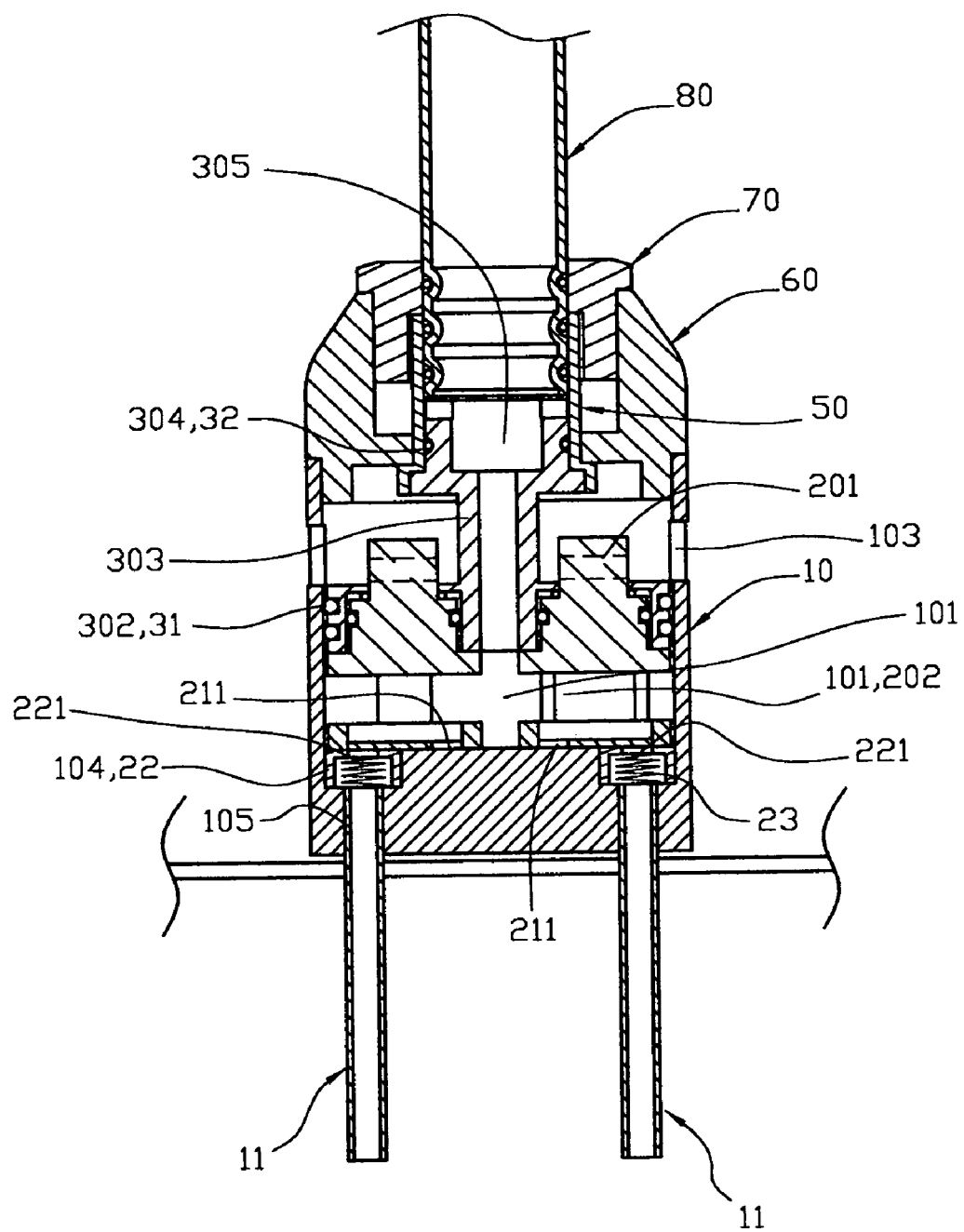
FIG. 3 is a partially cut-away plan cross-sectional view of the water faucet as shown in FIG. 1.
Figure 4:
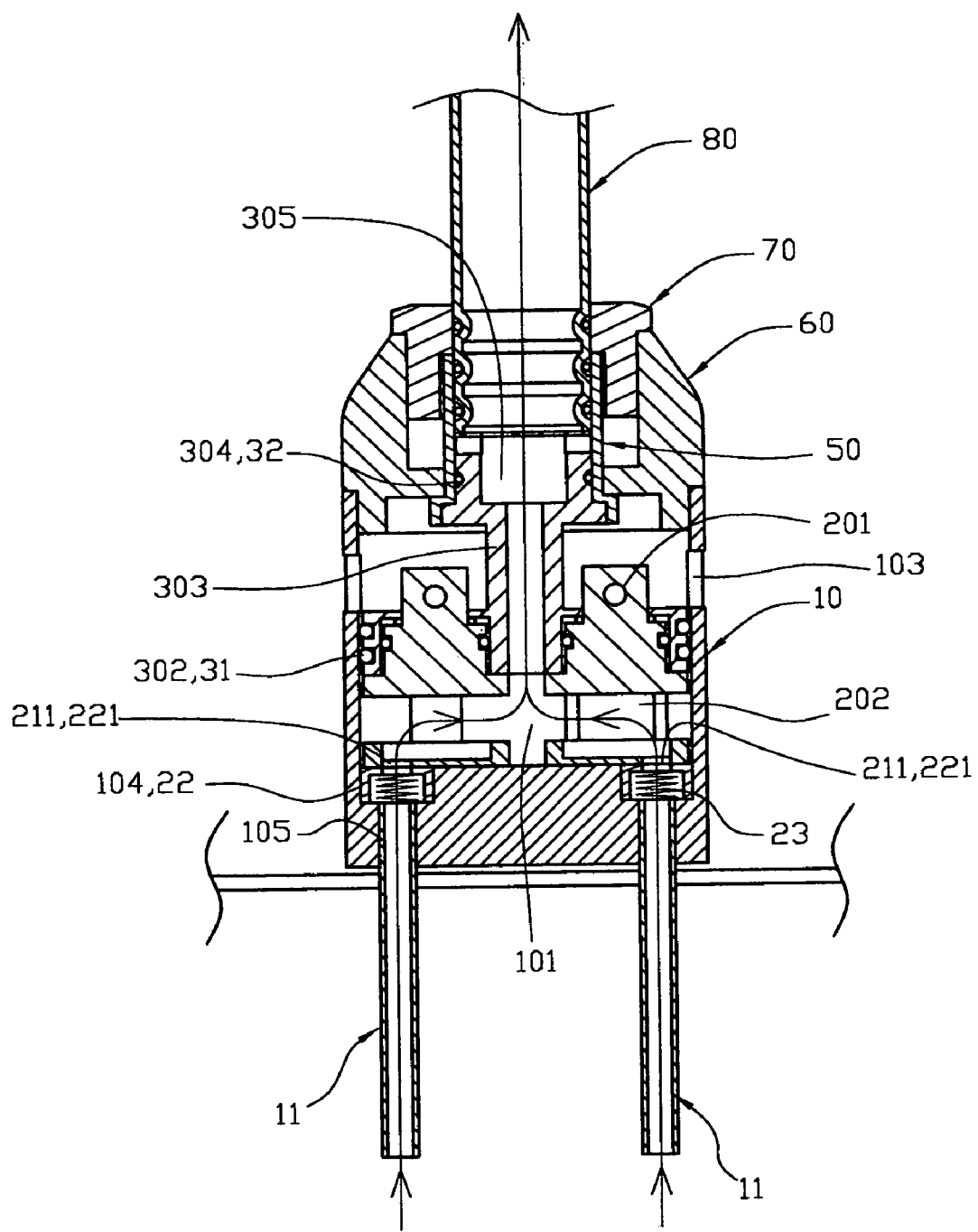
FIG. 4 is a schematic operational view of the water faucet as shown in FIG. 3.

In practice, each of the two control plates 21 is movable between a first position as shown in FIG. 4 where the control hole 211 of each of the two control plates 21 aligns with the conducting hole 221 of a respective one of the two conducting members 22 and a second position as shown in FIG. 3 where each of the two control plates 21 seals the conducting hole 221 of a respective one of the two conducting members 22 to interrupt a connection between the control hole 211 of each of the two control plates 21 and the conducting hole 221 of a respective one of the two conducting members 22.

The valve body 10 has a peripheral wall formed with a guide slot 103 to allow passage of the two control handles 40. The valve chamber 101 of the valve body 10 has an end formed with an inner thread 102. Each of the two water inlet holes 105 of the valve body 10 is located under and connected to a respective one of the two receiving recesses 104, and the water faucet further comprises two water inlet pipes 11 each mounted in a respective one of the two water inlet holes 105 of the valve body 10 and connected to a hot water source (not shown) and a cold water source (not shown) respectively, and two elastic members 23 each mounted in a respective one of the two receiving recesses 104 of the valve body 10 and each biased between the valve body 10 and a respective one of the two conducting members 22.

Each of the two control plates 21 is rested on a respective one of the two conducting members 22. In addition, the control hole 211 is located eccentrically in each of the two control plates 21.

The valve seat 30 is formed with two pivot holes 301, each of the two control valves 20 has an end formed with a pivot shaft 201 pivotally mounted in and protruded outward from a respective one of the two pivot holes 301 of the valve seat 30, and the distal end of each of the two control handles 40 is secured on the pivot shaft 201 of a respective one of the two control valves 20 to rotate the two control valves 20.

The valve seat 30 has an inside formed with a water outlet hole 305 connected to the valve chamber 101 of the valve body 10 and has a peripheral wall formed with a plurality of annular grooves 302 for mounting a plurality of O-rings 31 urged on the valve chamber 101 of the valve body 10. The valve seat 30 has a side formed with a mounting seat 303.

The water faucet further comprises a water outlet pipe 80 mounted on the valve seat 30 and connected to the water outlet hole 305 of the valve seat 30, a threaded lower urging member 50 mounted on the mounting seat 303 of the valve seat 30 and rested on the water outlet pipe 80, a threaded outer urging member 60 screwed into the inner thread 102 of the valve body 10 and rested on the lower urging member 50, and a threaded upper urging member 70 mounted between the lower urging member 50 and the outer urging member 60 and urged on the water outlet pipe 80. The mounting seat 303 of the valve seat 30 has a peripheral wall formed with an annular grooves 304 for mounting an O-ring 32 urged on the lower urging member 50.

In operation, when the two control handles 40 are pivoted on the valve body 10, the two control valves 20 are rotated to rotate the two control plates 21. When each of the two control plates 21 is moved to the position as shown in FIG. 4, the control hole 211 of each of the two control plates 21 aligns with the conducting hole 221 of a respective one of the two conducting members 22, so that the water from the two water inlet pipes 11 in turn flows through the conducting hole 221 of each of the two conducting members 22, the control hole 211 of each of the two control plates 21, the inside and the water outlet ports 202 of each of the two control valves 20, the valve chamber 101 of the valve body 10 and the water outlet hole 305 of the valve seat 30 into the water outlet pipe 80 and is injected outward from the water outlet pipe 80.

Alternatively, when each of the two control plates 21 is moved to the position as shown in FIG. 3, each of the two control plates 21 closes and seals the conducting hole 221 of a respective one of the two conducting members 22 to interrupt the connection between the control hole 211 of each of the two control plates 21 and the conducting hole 221 of a respective one of the two conducting members 22, thereby stopping the water flow.

Figure 5:
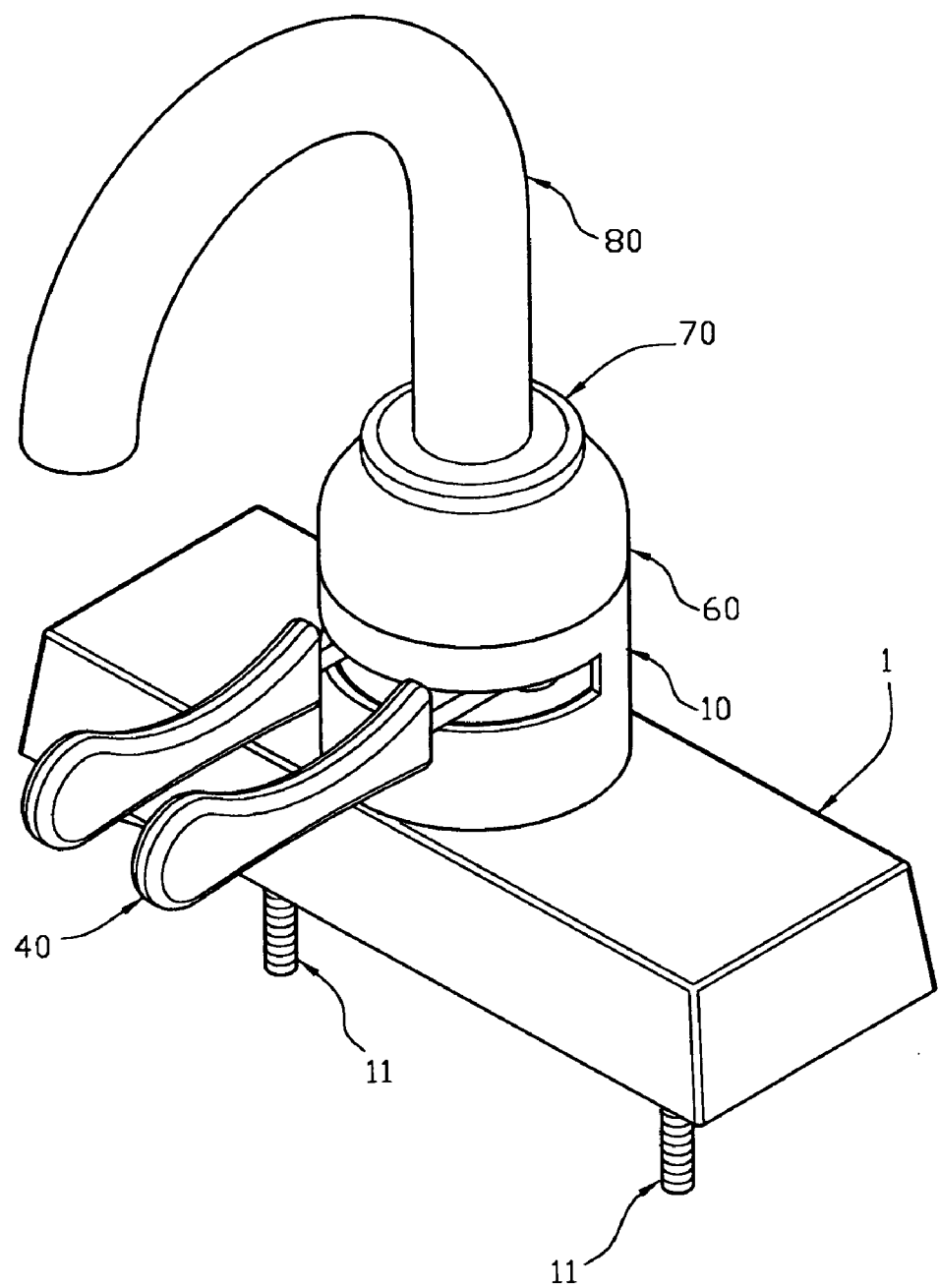
FIG. 5 is a perspective view of a water faucet in accordance with another embodiment of the present invention.
Figure 6:
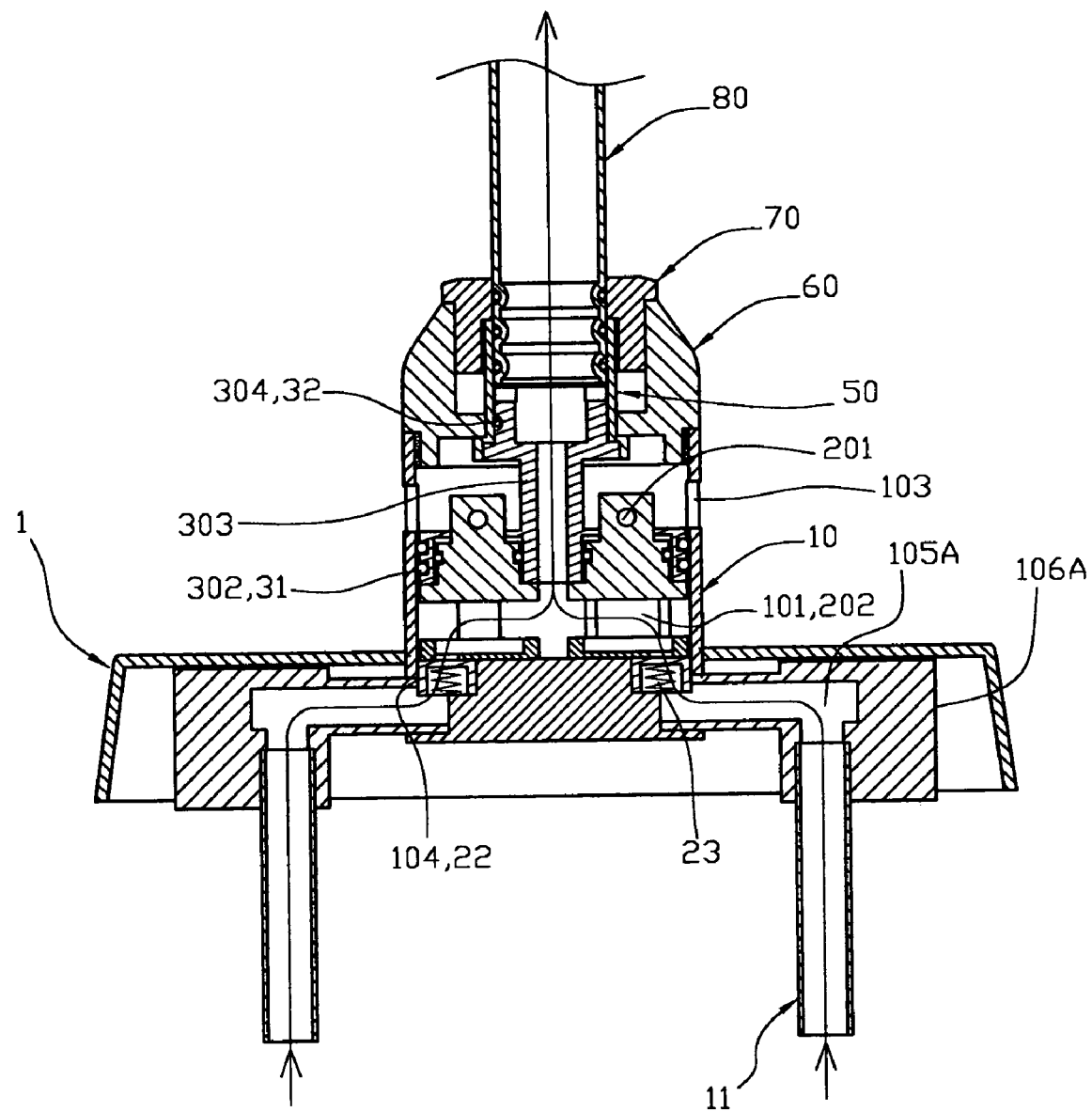
FIG. 6 is a partially cut-away plan cross-sectional view of the water faucet as shown in FIG. 5.

Referring to FIGS. 5 and 6, the valve body 10 has two opposite sides each provided with a substantially inverted L-shaped water inlet seat 106A, and each of the two water inlet holes 105A is formed in the water inlet seat 106A and is substantially inverted L-shaped. Each of the two water inlet holes 105A of the valve body 10 is connected to a respective one of the two receiving recesses 104. The water faucet further comprises a cover 1 mounted on the valve body 10 to cover the water inlet seat 106A.

Figure 7:
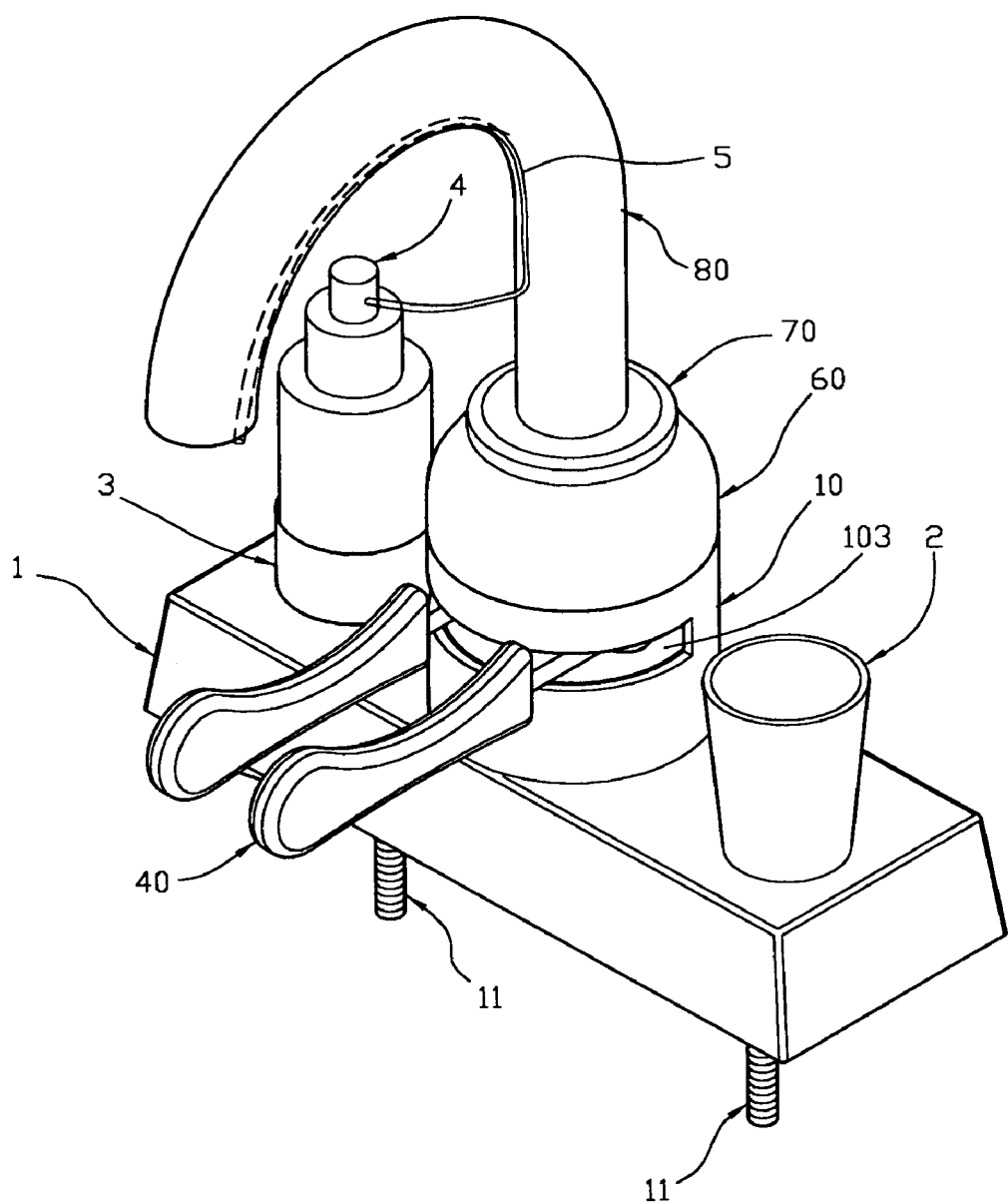
FIG. 7 is a perspective view of a water faucet in accordance with another embodiment of the present invention.

Referring to FIG. 7, the cover 1 has a flat surface having a first side formed with a placing recess 3 for receiving a bottle 4 and a second side for supporting a cup 2. The bottle 4 contains a cleaning agent and is provided with an extension pipe 5 extended along the water outlet pipe 80.

Figure 8:
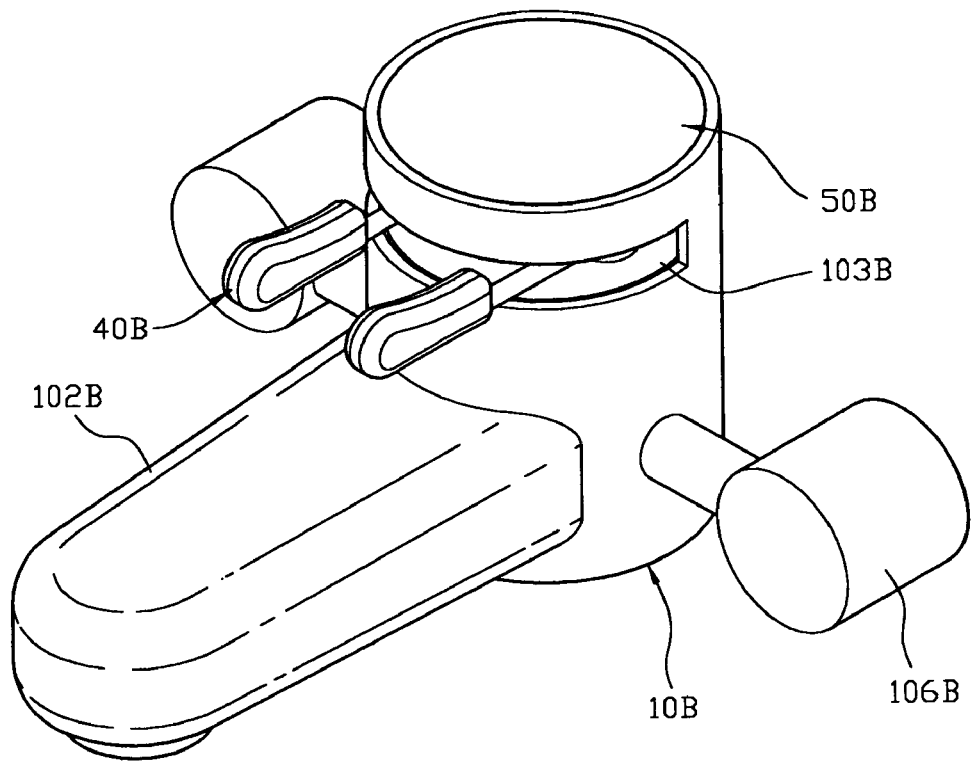
FIG. 8 is a perspective view of a water faucet in accordance with another embodiment of the present invention.
Figure 9:
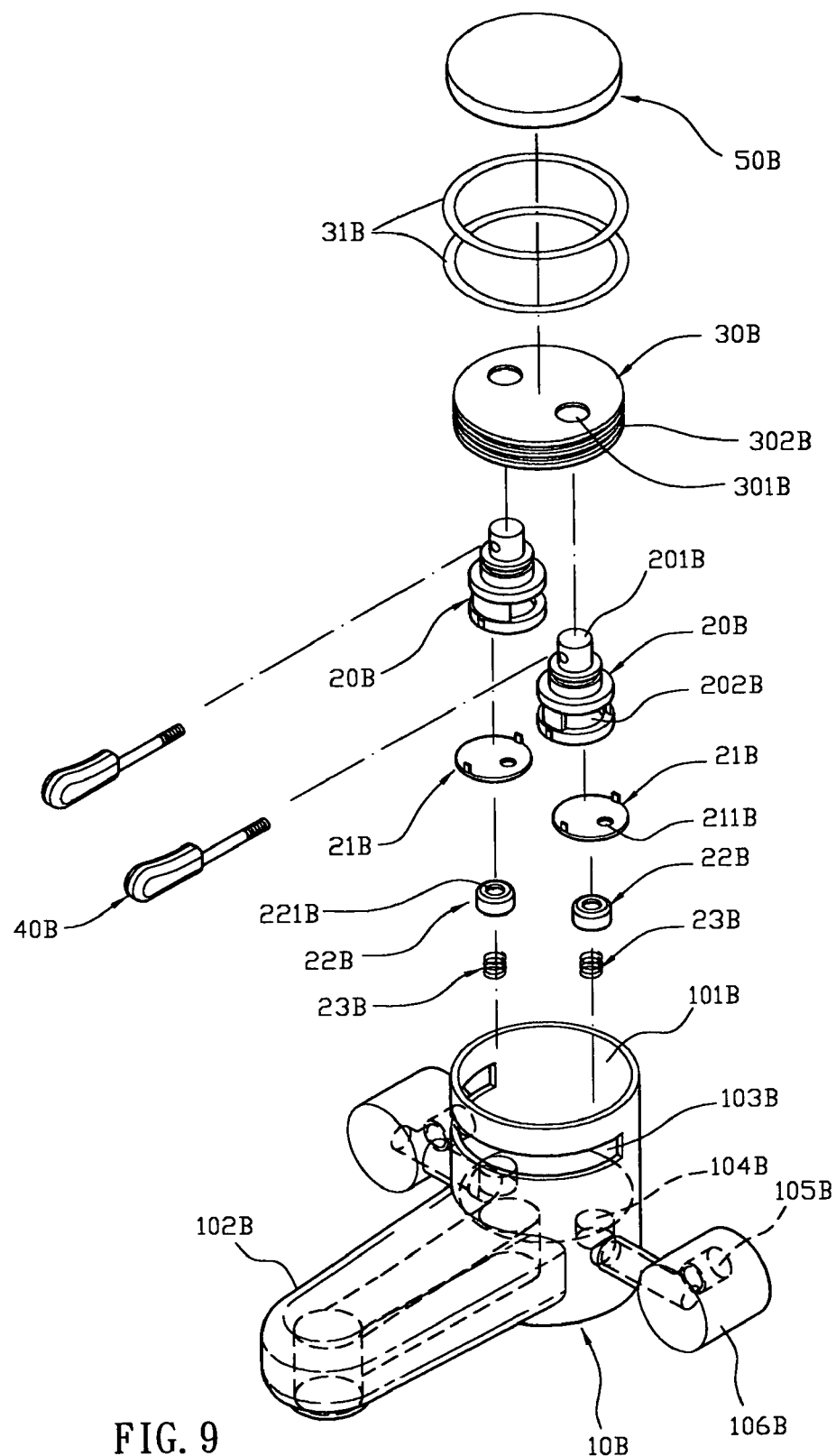
FIG. 9 is an exploded perspective view of the water faucet as shown in FIG. 8.
Figure 10:
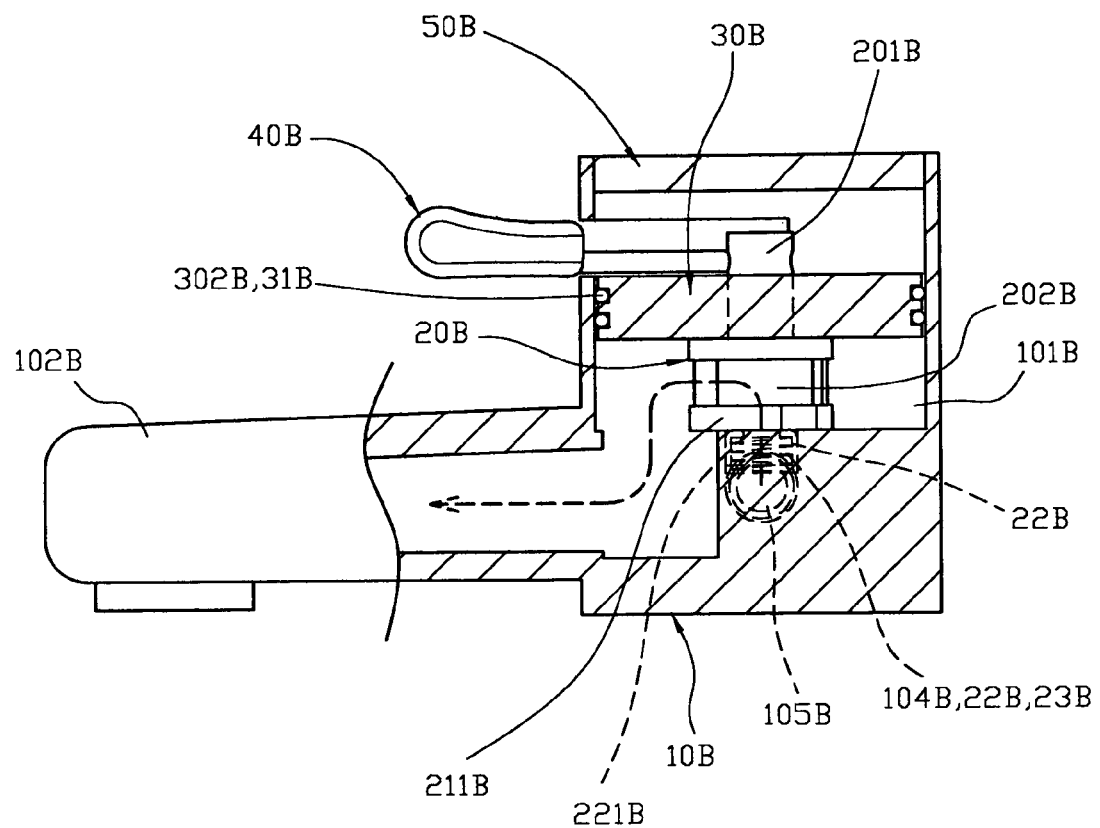
FIG. 10 is a partially cut-away plan cross-sectional view of the water faucet as shown in FIG. 8.

Referring to FIGS. 8–10, a water faucet in accordance with another embodiment of the present invention comprises a valve body 10B having an inside formed with a valve chamber 101B and an end face formed with two receiving recesses 104B and two water inlet holes 105B, two conducting members 22B each mounted in a respective one of the two receiving recesses 104B of the valve body 10B and each formed with a conducting hole 221B communicating with a respective one of the two water inlet holes 105B of the valve body 10B, a valve seat 30B mounted in the valve chamber 101B of the valve body 10B, two control valves 20B each rotatably mounted on the valve seat 30B and each having a peripheral wall formed with two opposite water outlet ports 202B each communicating with the valve chamber 101B of the valve body 10B, two control handles 40B each pivotally mounted on the valve body 10B and each having a distal end secured on a respective one of the two control valves 20B to rotate the two control valves 20B, and two control plates 21 each secured on a respective one of the two control valves 20B to rotate therewith and each formed with a control hole 211B that communicates with the water outlet ports 202 of the respective control valve 20B and is movable to align with the conducting hole 221B of a respective one of the two conducting members 22B.

In practice, each of the two control plates 21B is movable between a first position where the control hole 211B of each of the two control plates 21B aligns with the conducting hole 221B of a respective one of the two conducting members 22B and a second position where each of the two control plates 21B seals the conducting hole 221B of a respective one of the two conducting members 22B to interrupt a connection between the control hole 211B of each of the two control plates 21B and the conducting hole 221B of a respective one of the two conducting members 22B.

The valve body 10B has a peripheral wall formed with a guide slot 103B to allow passage of the two control handles 40B and formed with a protruding water outlet pipe 102B connected to the valve chamber 101B. The valve body 10B has two opposite sides each provided with a substantially inverted L-shaped water inlet seat 106B connected to a hot water source (not shown) and a cold water source (not shown) respectively, and each of the two water inlet holes 105B is formed in the water inlet seat 106B and is connected to a respective one of the two receiving recesses 104B.

The water faucet further comprises two elastic members 23B each mounted in a respective one of the two receiving recesses 104B of the valve body 10B and each biased between the valve body 10B and a respective one of the two conducting members 22B, and an end cap 50B mounted in the valve chamber 101B of the valve body 10B to cover the valve seat 30B.

Each of the two control plates 21B is rested on a respective one of the two conducting members 22B. In addition, the control hole 211B is located eccentrically in each of the two control plates 21B.

The valve seat 30B is formed with two pivot holes 301B, each of the two control valves 20B has an end formed with a pivot shaft 201B pivotally mounted in and protruded outward from a respective one of the two pivot holes 301B of the valve seat 30B, and the distal end of each of the two control handles 40B is secured on the pivot shaft 201B of a respective one of the two control valves 20B to rotate the two control valves 20B. The valve seat 30B has a peripheral wall formed with a plurality of annular grooves 302B for mounting a plurality of O-rings 31B urged on the valve chamber 101B of the valve body 10B.

In operation, when the two control handles 40B are pivoted on the valve body 10B, the two control valves 20B are rotated to rotate the two control plates 21B. When each of the two control plates 21B is moved to the first position as shown in FIG. 10, the control hole 211B of each of the two control plates 21B aligns with the conducting hole 221B of a respective one of the two conducting members 22B, so that the water from the two water inlet holes 105B of the valve body 10B in turn flows through the conducting hole 221B of each of the two conducting members 22B, the control hole 211B of each of the two control plates 21B, the inside and the water outlet ports 202B of each of the two control valves 20B and the valve chamber 101B of the valve body 10B into the water outlet pipe 102B and is injected outward from the water outlet pipe 102B.

Alternatively, when each of the two control plates 21B is moved to the second position, each of the two control plates 21B closes and seals the conducting hole 221B of a respective one of the two conducting members 22B to interrupt the connection between the control hole 211B of each of the two control plates 21B and the conducting hole 221B of a respective one of the two conducting members 22B, thereby stopping the water flow.

Accordingly, the water faucet is bother available for an upright water outlet pipe 102 and a horizontal water outlet pipe 102B, so that the water faucet has different water output ways, thereby enhancing the versatility of the water faucet. In addition, the water faucet that is mounted easily and conveniently, thereby facilitating a user mounting the water faucet.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A water faucet, comprising:
    a valve body having an inside formed with a valve chamber and an end face formed with two receiving recesses and two water inlet holes;
    two conducting members each mounted in a respective one of the two receiving recesses of the valve body and each formed with a conducting hole communicating with a respective one of the two water inlet holes of the valve body;
    a valve seat mounted in the valve chamber of the valve body;
    two control valves each rotatably mounted on the valve seat and each having a peripheral wall formed with two opposite water outlet ports each communicating with the valve chamber of the valve body;
    two control handles each pivotally mounted on the valve body and each having a distal end secured on a respective one of the two control valves to rotate the two control valves; and
    two control plates each secured on a respective one of the two control valves to rotate therewith and each formed with a control hole that communicates with the water outlet ports of the respective control valve and is movable to align with the conducting hole of a respective one of the two conducting members.

2. The water faucet in accordance with claim 1, wherein each of the two control plates is movable between a first position where the control hole of each of the two control plates aligns with the conducting hole of a respective one of the two conducting members and a second position where each of the two control plates seals the conducting hole of a respective one of the two conducting members to interrupt a connection between the control hole of each of the two control plates and the conducting hole of a respective one of the two conducting members.

3. The water faucet in accordance with claim 1, wherein the valve body has a peripheral wall formed with a guide slot to allow passage of the two control handles.

4. The water faucet in accordance with claim 1, wherein each of the two water inlet holes of the valve body is located under and connected to a respective one of the two receiving recesses.

5. The water faucet in accordance with claim 1, further comprising two water inlet pipes each mounted in a respective one of the two water inlet holes of the valve body.

6. The water faucet in accordance with claim 1, further comprising two elastic members each mounted in a respective one of the two receiving recesses of the valve body and each biased between the valve body and a respective one of the two conducting members.

7. The water faucet in accordance with claim 1, wherein each of the two control plates is rested on a respective one of the two conducting members.

8. The water faucet in accordance with claim 1, wherein the control hole is located eccentrically in each of the two control plates.

9. The water faucet in accordance with claim 1, wherein the valve seat is formed with two pivot holes, each of the two control valves has an end formed with a pivot shaft pivotally mounted in and protruded outward from a respective one of the two pivot holes of the valve seat, and the distal end of each of the two control handles is secured on the pivot shaft of a respective one of the two control valves to rotate the two control valves.

10. The water faucet in accordance with claim 1, wherein the valve seat has an inside formed with a water outlet hole connected to the valve chamber of the valve body, and the water faucet further comprises a water outlet pipe mounted on the valve seat and connected to the water outlet hole of the valve seat.

11. The water faucet in accordance with claim 10, wherein the valve seat has a side formed with a mounting seat, the valve chamber of the valve body has an end formed with an inner thread, and the water faucet further a threaded lower urging member mounted on the mounting seat of the valve seat and rested on the water outlet pipe, a threaded outer urging member screwed into the inner thread of the valve body and rested on the lower urging member, and a threaded upper urging member mounted between the lower urging member and the outer urging member and urged on the water outlet pipe.

12. The water faucet in accordance with claim 11, wherein the mounting seat of the valve seat has a peripheral wall formed with an annular grooves for mounting an O-ring urged on the lower urging member.

13. The water faucet in accordance with claim 1, wherein the valve body has two opposite sides each provided with a water inlet seat, and each of the two water inlet holes is formed in the water inlet seat and is connected to a respective one of the two receiving recesses.

14. The water faucet in accordance with claim 13, further comprising a cover mounted on the valve body to cover the water inlet seat.

15. The water faucet in accordance with claim 13, wherein the water inlet seat is substantially inverted L-shaped.

16. The water faucet in accordance with claim 13, wherein each of the two water inlet holes is substantially inverted L-shaped.

17. The water faucet in accordance with claim 14, wherein the cover has a flat surface having a side formed with a placing recess for receiving a bottle.

18. The water faucet in accordance with claim 17, wherein the bottle contains a cleaning agent and is provided with an extension pipe extended along the water outlet pipe.

19. The water faucet in accordance with claim 1, further comprising an end cap mounted in the valve chamber of the valve body to cover the valve seat.

20. The water faucet in accordance with claim 1, wherein the valve seat has a peripheral wall formed with a plurality of annular grooves for mounting a plurality of O-rings urged on the valve chamber of the valve body.

* * * * *